US010876431B2

(12) United States Patent
Frey et al.

(10) Patent No.: US 10,876,431 B2
(45) **Date of Patent: *Dec. 29, 2020**

(54) PROCESS IMPROVEMENT THROUGH THE ADDITION OF POWER RECOVERY TURBINE EQUIPMENT IN EXISTING PROCESSES

(71) Applicant: UOP LLC, Des Plaines, IL (US)

(72) Inventors: Stanley J. Frey, Palatine, IL (US); Thomas Ebner, West Dundee, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,847

(22) Filed: Oct. 28, 2019

(65) Prior Publication Data

US 2020/0056509 A1 Feb. 20, 2020

Related U.S. Application Data

(63) Continuation of application No. 15/923,964, filed on Mar. 16, 2018, now Pat. No. 10,508,568.

(51) Int. Cl.
*F01K 7/16* (2006.01)
*F01K 23/06* (2006.01)
(Continued)

(52) U.S. Cl.
CPC .............. *F01K 7/165* (2013.01); *C10G 65/02* (2013.01); *F01K 23/064* (2013.01); *H02J 3/46* (2013.01);
(Continued)

(58) Field of Classification Search
CPC ....... F01K 7/165; F01K 23/064; C10G 65/02; H02J 3/46; F05D 2220/31; F05D 2220/62; F05D 2220/762
(Continued)

(56) References Cited

U.S. PATENT DOCUMENTS 2,436,683 A 4/1945 Wood, Jr.
3,971,211 A * 7/1976 Wethe ........................ F01K 7/32
60/39.181

(Continued)

FOREIGN PATENT DOCUMENTS

CN 102203780 A 9/2011
CN 103917280 A 7/2014

(Continued)

OTHER PUBLICATIONS

Tsourapas, Vasilios, Control Analysis of Integrated Fuel Cell Systems with Energy Recuperation Devices, 2007.

(Continued)

*Primary Examiner* — Pedro J Cuevas

(57) ABSTRACT

Power recovery turbines can be used debottlenecking of an existing plant, as well as recover electric power when revamping a plant. A process for recovering energy in a petroleum, petrochemical, or chemical plant is described. A fluid stream having a first control valve thereon is identified. A first power-recovery turbine is installed at the location of the first control valve, and at least a portion of the first fluid stream is directed through the first power-recovery turbine to generate electric power as direct current therefrom. The electric power is then recovered.

20 Claims, 3 Drawing Sheets

(51) Int. Cl.
*H02J 3/46* (2006.01)
*C10G 65/02* (2006.01)

(52) U.S. Cl.
CPC ...... *F05D 2220/31* (2013.01); *F05D 2220/62* (2013.01); *F05D 2220/762* (2013.01)

(58) Field of Classification Search
USPC ................ 290/44, 52, 54; 60/651, 770–779; 700/287
See application file for complete search history.

(56) References Cited

U.S. PATENT DOCUMENTS 3,975,900 A * 8/1976 Pfefferle .................. F23R 3/26 60/773
4,031,404 A * 6/1977 Martz .................. F01K 23/108 290/40 R
4,037,655 A 7/1977 Carptenter
4,057,736 A 11/1977 Jeppson
4,285,481 A 8/1981 Biscomb
4,338,788 A * 7/1982 Fink ........................ F02C 3/205 60/648
4,455,614 A 6/1984 Martz et al.
4,660,375 A * 4/1987 Hyde ........................ F02C 9/20 60/773
5,209,634 A 5/1993 Owcarek
5,384,489 A 1/1995 Bellac
6,011,334 A 1/2000 Roland
6,216,463 B1 4/2001 Stewart
6,265,453 B1 7/2001 Kennedy
6,554,074 B2 4/2003 Longbottom
6,607,030 B2 8/2003 Bauer et al.
6,681,155 B1 1/2004 Fujita et al.
6,820,689 B2 11/2004 Sarada
6,898,540 B2 5/2005 Davies
7,002,261 B2 2/2006 Cousins
7,141,901 B2 11/2006 Spring
7,579,703 B2 8/2009 Shifrin
7,632,040 B2 12/2009 Cripps
7,946,789 B2 5/2011 Cripps
7,948,101 B2 5/2011 Burtch
8,404,918 B2 3/2013 Frey
8,510,015 B2 8/2013 Beausoleil et al.
8,680,704 B1 3/2014 Rooney
8,763,625 B1 7/2014 Carter
8,967,590 B2 3/2015 Minervini et al.
8,985,967 B2 3/2015 Gudivada
9,085,499 B2 7/2015 Frey et al.
9,235,228 B2 1/2016 Gazit et al.
9,764,272 B2 9/2017 Martin et al.
9,926,814 B2 * 3/2018 Roh .......................... F01K 7/32
10,082,049 B2 * 9/2018 Lee .......................... F01K 7/16
10,584,614 B2 * 3/2020 Auciello ................ F01K 23/10
10,753,235 B2 * 8/2020 Harris ...................... B01D 3/14
2004/0011523 A1 1/2004 Sarada
2005/0034463 A1 2/2005 Simpson et al.
2006/0054318 A1 3/2006 Sarada
2007/0217995 A1 * 9/2007 Matsumura ............... C25B 1/04 423/657
2008/0015839 A1 1/2008 Noureldin et al.
2008/0017369 A1 1/2008 Sarada
2008/0238105 A1 10/2008 Ortiz et al.
2008/0290663 A1 11/2008 Shifrin
2009/0125152 A1 5/2009 Skowronski et al.
2010/0019496 A1 1/2010 Yu
2010/0154428 A1 6/2010 Yu
2011/0077448 A1 3/2011 Frey
2011/0100004 A1 5/2011 Al-Mazeedi
2011/0167824 A1 * 7/2011 Mak .......................... F17C 9/02 60/651
2011/0179799 A1 * 7/2011 Allam ....................... F02C 3/04 60/772
2011/0302926 A1 * 12/2011 Hansson ............... F01K 21/047 60/772
2012/0107227 A1 5/2012 Fischer et al.
2012/0118526 A1 5/2012 Sudau et al.
2012/0227440 A1 9/2012 Guidati et al.
2012/0245754 A1 9/2012 Mehnert
2012/0260667 A1 10/2012 Chillar et al.
2012/0326443 A1 12/2012 Vince et al.
2013/0019530 A1 1/2013 Favilli et al.
2013/0199185 A1 8/2013 Wain et al.
2014/0331672 A1 11/2014 Filippi et al.
2015/0118131 A1 4/2015 Martin et al.
2016/0079756 A1 3/2016 Ikeyama et al.
2016/0141878 A1 5/2016 Johansen
2016/0161536 A1 6/2016 Amminudin
2016/0252015 A1 9/2016 Kusumi et al.
2016/0319198 A1 11/2016 Quanci et al.
2016/0326916 A1 * 11/2016 Roh ...................... F01K 25/103
2017/0058206 A1 3/2017 Noureldin et al.
2017/0058207 A1 3/2017 Noureldin et al.
2019/0284966 A1 * 9/2019 Harris ..................... F01D 15/10
2019/0286072 A1 * 9/2019 Frey .................. H02J 13/00002
2019/0288517 A1 * 9/2019 Frey ...................... F01K 23/064

FOREIGN PATENT DOCUMENTS

CN 104463341 A 3/2015
CN 206538206 10/2017
EP 0552039 7/1993
EP 2778354 A1 9/2014
FR 2414162 8/1979
RU 2014114067 10/2015
WO 2012128928 A1 9/2012
WO 2014119569 A1 8/2014
WO 2014178079 A2 11/2014
WO 2015065949 A1 5/2015
WO 2016177376 A1 11/2016

OTHER PUBLICATIONS

The Elliot Group, Maximize the Efficiency of your Steam Process, 2014.
U.S. Department of Energy, Replace Pressure-Reducing Valves with Backpressure Turbogenerators.
Mechanical Solutions, Inc., Replacing a Pressure Reducing Valve with a Hydro Turbine for a Municipal Water Supply, Jul. 19, 2016.
International Search Report from PCT Application No. PCT/US2019/022451, dated Jun. 27, 2019.
Written Opinion from corresponding PCT application No. PCT/US2019/022451, dated Jun. 25, 2019.
Frey, Stanley Joseph, et al., U.S. Appl. No. 15/923,990, filed Mar. 16, 2018 and entitled , "Turbine with Supersonic Separation".
Frey, Stanley J., et al., U.S. Appl. No. 62/644,086, filed Mar. 16, 2018 and entitled "System for Consolidation and Use of Power Recovered from a Turbine in a Process Unit".
Frey, Stanley J., et al., U.S. Appl. No. 62/644,104, filed Mar. 16, 2018 and entitled "System for Power Recovery from Quench and Dilution Vapor Streams".
Frey, Stanley Joseph, et al., U.S. Appl. No. 15/924,037, filed Mar. 16, 2018 and entitled "Power Recovery from Quench and Dilution Vapor Streams".
Frey, Stanley J., U.S. Appl. No. 15/923,936, filed Mar. 16, 2018 and entitled "Energy-Recovery Turbines for Gas Streams".
Frey, Stanley J., et al., U.S. Appl. No. 15/923,945, filed Mar. 16, 2018 and entitled "Consolidation and Use of Power Recovered from a Turbine in a Process Unit".
Harris, James W., et al., U.S. Appl. No. 15/924,034, filed Mar. 16, 2018 and entitled "Use of Recovered Power in a Process".
Frey, Stanley Joseph, et al., U.S. Appl. No. 15/923,997, filed Mar. 16, 2018 and entitled "Processes for Adjusting at Least One Process Condition of a Chemical Processing Unit with a Turbine".
Frey, Stanley Joseph, et al., U.S. Appl. No. 15/923,978, filed Mar. 16, 2018 and entitled "Hydroprocessing Unit with Power Recovery Turbines".

(56) References Cited

OTHER PUBLICATIONS

Harris, James W., et al., U.S. Appl. No. 15/923,995, filed Mar. 16, 2018 and entitled "Steam Reboiler with Turbine".

* cited by examiner

PROCESS IMPROVEMENT THROUGH THE ADDITION OF POWER RECOVERY TURBINE EQUIPMENT IN EXISTING PROCESSES

CROSS-REFERENCE TO RELATED APPLICATIONS

This application is a Continuation of copending application Ser. No. 15/923,964 filed Mar. 16, 2018, which is incorporated herein by reference in its entirety.

BACKGROUND OF THE INVENTION

Minimization of power consumption in mechanical drives (pumps and compressors) can be done by a detailed evaluation of the required power and heat inputs during the new unit design step, looking for areas where the energy addition can be minimized. However, due to the need to conserve capital by minimizing the number of pieces of equipment, compressors and pumps are often over-sized as the process stream is compressed or pressurized with a compressor or pump up to a single high pressure header and then manifolded downstream to several downstream branches having significant pressure reduction to much lower pressure services manifesting the inherent energy inefficiency resulting from the minimal capital design. Even in situations where there is no manifolding, conventional flow control includes a control valve downstream of the driver which necessarily dissipates energy and can later be a point of potential energy recovery.

Where an existing process is being revamped, the capital cost for the large drivers and control valves has already been expended, and the opportunity for capital savings does not exist. Consequently, the option of changing equipment to conserve energy and taking the downtime needed for revamping the process often results in poor paybacks for energy conservation projects.

Therefore, there is a need for ways to improve existing processes using power-recovery turbines that are cost effective while utilizing the existing equipment.

DETAILED DESCRIPTION

Figure 1:
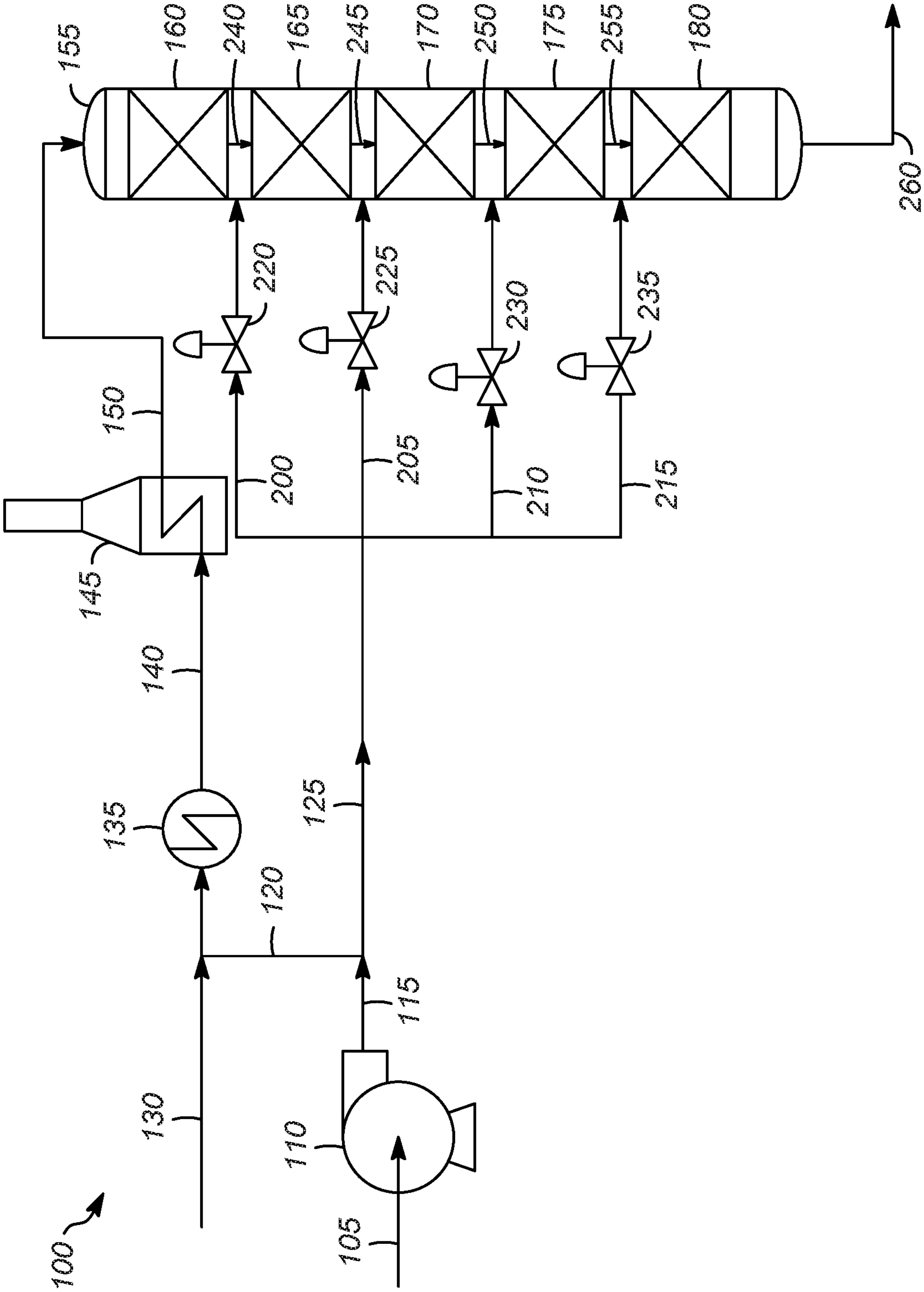
FIG. 1 is an illustration of an example process.

The addition of power recovery turbines that not only conserve energy, but also result in debottlenecking of an existing plant, can make revamping opportunities much more attractive than in a new installation where capital minimization and speed to completion are the primary goals.

When a fluid stream in a process passes through the power-recovery turbine generator, the exit temperature of the fluid stream is lower than it is from a fluid stream passing through only a control valve. For processes that are limited by the amount of cooling available for certain fluid streams, the lower temperature of the exit stream can allow increased throughput for the process. This increased throughput provides a significant benefit in addition to the power recovery from the turbine generator. The combination of the increased throughput and the power recovery improves the economic justification for the capital expenditure.

One aspect of the invention is a process for recovering energy in a petroleum, petrochemical, or chemical plant. In one embodiment, the process comprises identifying a first fluid stream having a first control valve thereon in a process zone; installing a first power-recovery turbine at the location of the first control valve; directing at least a portion of the first fluid stream through the first power-recovery turbine to generate electric power as direct current therefrom; and recovering the electric power.

In some embodiments, the first power-recovery turbine is installed in parallel with the first control valve. In some embodiments, the first power-recovery turbine is installed in series with the first control valve. In some embodiments, the first power-recovery turbine replaces the first control valve.

In some embodiments, the first control valve is isolated from the process in normal operation to avoid the process fluid contacting the valve stem active packing. This can typically be done by closing gate valves on either side of the control valve. Because the present invention involves a revamp or modification to an existing process unit, the control valve and the isolating gate valves are typically already present making the inclusion of the now "back up" control valve to the turbine incur no additional cost during the revamp.

In some embodiments, the power-recovery turbine is sealed with no active gland prone to leakage and fugitive emission. This type of turbine device is described in Development of a 125 kW AMB Expander/Generator for Waste Heat Recovery, Reference: *Journal of Engineering for Gas Turbines and Power*, July 2011, Vol 133, Pages 072503-1 to 072503-6.

In some embodiments, where the first fluid stream is a gas, installation of the first power-recovery turbine results in a lower temperature of the first fluid stream compared to the first fluid stream with only the control valve; and the lower temperature debottlenecks plant throughput by increased cooling of a portion of the plant relative to operation without the power-recovery turbine generator. The increased cooling occurs because the turbine extracts more energy from the first fluid stream than does the control valve. The turbine approximates an isentropic expansion with loss of mechanical and thermal energy to drive the turbine. This as compared to an adiabatic, highly irreversible expansion through a valve where the pressure drop is conducted without any energy extracted or heat transferred from the system. The lower temperature from the turbine could allow greater throughput by, for example, cooling a reactor bed with less gas than for the valve case which results in a higher outlet temperature. This lower gas flow requirement can enable either energy savings in the compression section for the gas or, alternatively, the hydrocarbon feed rate to a reactor limited by a high temperatures could be increased as the temperature limitation will be somewhat relieved due to the lower temperature gas quench stream. Many exothermic reactor beds typically have high temperature limits to avoid the possibility of auto propagation of heat release as unwanted reactions can start to increase temperature catastrophically rapidly once started. In some embodiments, the portion of the plant is within a reaction zone.

In some embodiments, process further comprises rectifying the recovered electrical power to direct current and inverting the electrical power into recovered alternating current; and providing the recovered alternating current to a first substation.

A process substation is an electrical area dedicated to electrical power distribution, such as three-phase, low voltage (e.g., <600 VAC) power grid, to a group of process unit services. There are typically several process and utility substations within a refinery, or petrochemical or chemical plant, and there is one main substation where the main distribution system is located. The process substation is comprised of transformers, an electrical building, switchgear of different voltage levels, motor control centers (MCCs) and single phase distribution panels. Most process substations serve a very large kW electrical load, some of it at low voltage (e.g., <600V) and some of it at medium voltage (for the larger motors, for example, ≥250HP). As a result, a typical process substation will have both medium and low voltage buses.

In some embodiments, when power is recovered, the output of the inverter can be connected to the process substation's low voltage distribution system or, if a sufficiently large amount of power is recovered, it can be stepped-up to the process substation's medium voltage distribution system. Large amounts of recovered power with stepped-up voltage can also be connected to medium voltage systems in other process substations or in the main substation (medium voltage is generally used to reduce voltage drop). However, this incurs additional costs of transformation, switchgear, cabling, etc. and requires significant real estate for the additional equipment.

In some embodiments, the substation comprises at least one alternating current bus, and the output of the DC to AC inverter is electrically connected to the at least one alternating current bus, such as a low voltage (e.g., <600 VAC) bus, in the substation.

In some embodiments, the substation comprises at least one alternating current bus, and the output of the DC to AC inverter is electrically transformed up to medium voltage and then connected to a medium voltage (e.g., 5 kVAC or 15 kVAC Class) bus within the process substation.

In some embodiments, there is a second substation, and the output of the first substation is electrically connected to the second substation. In some embodiments, the second substation has a higher voltage than a voltage of the first substation, and there is a step-up transformer to step-up the voltage of the DC to AC inverter to the higher voltage of the second substation, such as a medium voltage.

In some embodiments, the first substation is electrically connected to at least two petroleum, petrochemical, or chemical process zones. In some embodiments, the output of the first substation is electrically connected to a piece of equipment in the at least two process zones.

In some embodiments, the power will be generated via power-recovery turbines with variable resistance to flow made possible by either guide vanes or variable load on the electrical power generation circuit. The power emanating from the turbines will be DC and can be combined into a single line and sent to an inverter that converts the DC power to AC in sync with and at the same voltage as a power grid. Because the power-recovery turbines produce DC output, it allows their electrical current to be combined without concern for synchronizing frequencies, rotational speeds, etc. for the controlling power-recovery turbines that may have fluctuating and variable rotational speeds individually.

In some embodiments, the process for controlling a flowrate of and recovering energy from a process stream in a processing unit comprises directing a portion of the process stream through one or more variable-resistance power-recovery turbines to control the flowrate of the process stream using a variable nozzle turbine, inlet variable guide vanes, or direct coupled variable electric load, to name a few, to vary the resistance to flow through the turbine.

The resistance to rotation of the variable-resistance turbine can be varied by an external variable load electric circuit which is in a magnetic field from a magnet(s) that is rotating on the turbine. As more load is put on the circuit, there is more resistance to rotation on the turbine. This in turn imparts more pressure drop across the turbine and slows the process stream flow. An algorithm in the device can also calculate the actual flow through the device by measuring the turbine RPM's and the load on the circuit. The resistance to rotation flow can also be varied by variable position inlet guide vanes. In some embodiments, the power will be generated via power-recovery turbines with variable resistance to flow made possible by either guide vanes or variable load on the electrical power generation circuit. An algorithm to calculate actual flow using the guide vanes position, power output and RPM's can be used.

If slow control response of the turbine is an issue, then the use of the turbine is limited to slow responding or "loose" control point applications. A slow responding application is contemplated to have a response time to reach half way (i.e., 50% of a difference) between a new (or target) steady state condition (e.g., temperature, pressure, flow rate) from an original (or starting) steady state condition when the new (or target) condition differs from the original (or stating) condition of at least 10%, of at least one second, or even greater, for example, ten seconds, at least one minute, at least ten minutes, or an hour or more, for half of the change to completed.

In some embodiments, the power grid comprises a power grid internal to the process substation, a power grid external to the process substation, or both. When the power grid is internal to the process substation, the output of the DC to AC inverter can be used in the process substation directly. For example, there may be one or more alternating current buses in the process substation. Alternatively, when the power grid is external to the process substation, it may be at a higher voltage than the process substation. In this case, there is a transformer at the process substation that steps-up the output of the DC to AC inverter to the higher voltage of the power grid external to the process substation.

In some embodiments, the process further comprises identifying a second fluid stream having a second control valve thereon; installing a second power-recovery turbine at the location of the second control valve; directing at least a portion of the second fluid stream through the second power-recovery turbine to generate electric power as direct current therefrom; and combining the direct current from the first power-recovery turbine with the direct current from the second power-recovery turbine generator.

In some embodiments, the process further comprises providing the recovered direct current to a piece of equipment in the plant.

In some embodiments, the process further comprises receiving information from a plurality of pressure reducing devices, the plurality of pressure reducing devices comprising: the first power-recovery turbine; the first control valve; or, both; determining a power loss value or a power generated value for each of the pressure reducing devices; determining a total power loss value or a total power generated value based upon the power loss values or the power generated values from each of the pressure reducing devices; and, displaying the total power loss value or the total power generated value on at least one display screen.

In some embodiments, the process further comprises adjusting at least one process parameter in the process zone based upon the total power loss value or the total power generated value.

In some embodiments, the process further comprises displaying the power loss value or the power generated value on the at least one display screen.

In some embodiments, the process further comprises, after the at least one process parameter has been adjusted, determining an updated power loss value or an updated power generated value for each of the pressure reducing devices; determining an updated total power loss value or an updated total power generated value for the process zone based upon the updated power loss values or the updated power generated values from each of the pressure reducing devices; and, displaying the updated total power loss value or the updated total power generated value on the at least one display screen.

In some embodiments, the process further comprises receiving information associated with conditions outside of the process zone, wherein the total power loss value or the total power generated value target is determined based in part upon the information associated with conditions outside of the process zone.

In some embodiments, the process further comprises receiving information associated with a throughput of the process zone, wherein the total power loss value or the total power generated value is determined based in part upon the information associated with the throughput of the process zone.

In some embodiments, the process further comprises maintaining the throughput of the process zone while adjusting the at least one process parameter of the portion of a process zone based upon the total power loss value or the total power generated value.

In some embodiments, the process comprises identifying a first fluid stream having a first control valve thereon in a process zone; installing a first power-recovery turbine at the location of the first control valve; directing at least a portion of the first fluid stream through the first power-recovery turbine to generate electric power as alternating current therefrom; recovering the electric power; rectifying the recovered electrical power to direct current and inverting the electrical power into recovered alternating current; and providing the recovered alternating current to a first substation.

The revamping approach can be applied to any type of process including a fluid stream flowing through a control valve. Additional advantages can be obtained in processes where there is bottleneck which can be reduced or overcome due to lower process temperatures exiting the power-recovery turbine generator. Suitable processes include, but are not limited to, a hydroprocessing zone, an alkylation zone, a separation zone, an isomerization zone, a catalytic reforming zone, a fluid catalyst cracking zone, a hydrogenation zone, a dehydrogenation zone, an oligomerization zone, a desulfurization zone, an alcohol to olefins zone, an alcohol to gasoline zone, an extraction zone, a distillation zone, a sour water stripping zone, a liquid phase adsorption zone, a hydrogen sulfide reduction zone, an alkylation zone, a transalkylation zone, a coking zone, and a polymerization zone.

FIG. 1 illustrates an existing hydroprocessing process 100 which can be used to explain the revamping process. Hydrogen stream 105 is compressed in compressor 110. The compressed hydrogen stream 115 is split into two portions, first and second hydrogen streams 120 and 125. First hydrogen stream 120 is combined with the hydrocarbon feed stream 130 and sent through heat exchanger 135 to raise the temperature. The partially heated feed stream 140 is sent to fired heater 145 to raise the temperature of the feed stream 150 exiting the fired heater 145 to the desired inlet temperature for the hydroprocessing reaction zone 155.

Second hydrogen stream 125 is divided into four parts, hydrogen quench streams 200, 205, 210, 215. Each of the hydrogen quench streams 200, 205, 210, 215 has an associated control valve 220, 225, 230, 235 to control the flow of hydrogen entering the hydroprocessing bed.

As shown, hydroprocessing reaction zone 155 has five hydroprocessing beds 160, 165, 170, 175, and 180. Heated feed stream 150, which contains hydrogen and hydrocarbon feed to be hydroprocessed, enters the first hydroprocessing bed 160 where it undergoes hydroprocessing. The effluent from the first hydroprocessing bed 160 is mixed with first hydrogen quench stream 200 to form first quenched hydroprocessed stream 240.

The first quenched hydroprocessed stream 240 is sent to the second hydroprocessing bed 165 where it undergoes further hydroprocessing. The effluent from the second hydroprocessing bed 165 is mixed with second hydrogen quench stream 205 to form second quenched hydroprocessed stream 245.

The second quenched hydroprocessed stream 245 is sent to the third hydroprocessing bed 170 where it undergoes further hydroprocessing. The effluent from the third hydroprocessing bed 170 is mixed with third hydrogen quench stream 210 to form third quenched hydroprocessed stream 250.

The third quenched hydroprocessed stream 250 is sent to the fourth hydroprocessing bed 175 where it undergoes further hydroprocessing. The effluent from the fourth hydroprocessing bed 175 is mixed with fourth hydrogen quench stream 215 to form fourth quenched hydroprocessed stream 255.

The fourth quenched hydroprocessed stream 255 is sent to the fifth hydroprocessing bed 180 where it undergoes further hydroprocessing. The effluent 260 from the fifth hydroprocessing bed 180 can be sent to various processing zones, such as heat exchange with the feed, water wash to dissolve and extract salts, vapor liquid separation, stripping, second stage hydroprocessing, distillation and amine treating in many combinations.

Figure 2:
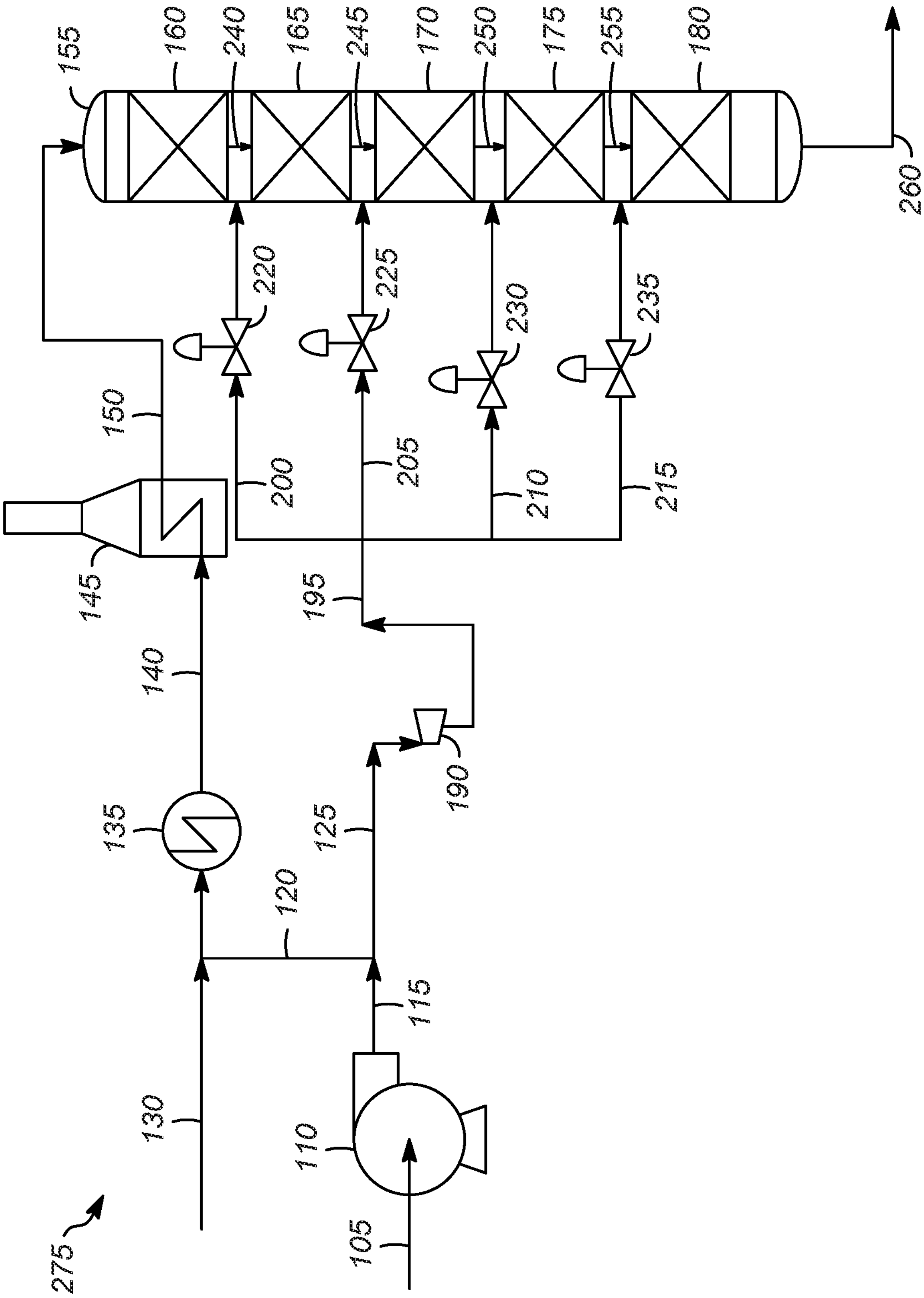
FIG. 2 is an illustration of one embodiment of the revamped process of the present invention.

FIG. 2 illustrates one embodiment of a modified process 275. Hydrogen stream 105 is compressed in compressor 110. The compressed hydrogen stream 115 is split into two portions, first and second hydrogen streams 120 and 125. First hydrogen stream 120 is combined with the hydrocarbon feed stream 130 and sent through heat exchanger 135 to raise the temperature. The partially heated feed stream 140 is sent to fired heater 145 to raise the temperature of the feed stream 150 exiting the fired heater 145 to the desired inlet temperature for the hydroprocessing reaction zone 155.

Second hydrogen stream 125 is sent to a power-recovery turbine 190 generating power and reducing the pressure of the second hydrogen stream 125. The reduced pressure hydrogen stream 195 is divided into four parts, hydrogen quench streams 200, 205, 210, 215. Each of the hydrogen quench streams 200, 205, 210, 215 has an associated control valve 220, 225, 230, 235 to control the flow of hydrogen entering the hydroprocessing bed.

Feed stream 150, which contains hydrogen and hydrocarbon feed to be hydroprocessed, enters the first hydroprocessing bed 160 where it undergoes hydroprocessing. The effluent from the first hydroprocessing bed 160 is mixed with first hydrogen quench stream 200 to form first quenched hydroprocessed stream 240.

The first quenched hydroprocessed stream 240 is sent to the second hydroprocessing bed 165 where it undergoes further hydroprocessing. The effluent from the second hydroprocessing bed 165 is mixed with second hydrogen quench stream 205 to form second quenched hydroprocessed stream 245.

The second quenched hydroprocessed stream 245 is sent to the third hydroprocessing bed 170 where it undergoes further hydroprocessing. The effluent from the third hydroprocessing bed 170 is mixed with third hydrogen quench stream 210 to form third quenched hydroprocessed stream 250.

The third quenched hydroprocessed stream 250 is sent to the fourth hydroprocessing bed 175 where it undergoes further hydroprocessing. The effluent from the fourth hydroprocessing bed 175 is mixed with fourth hydrogen quench stream 215 to form fourth quenched hydroprocessed stream 255.

The fourth quenched hydroprocessed stream 255 is sent to the fifth hydroprocessing bed 180 where it undergoes further hydroprocessing. The effluent 260 from the fifth hydroprocessing bed 180 can be sent to various processing zones, such as heat exchange with the feed, water wash to dissolve and extract salts, vapor liquid separation, stripping, second stage hydroprocessing, distillation and amine treating in many combinations.

Figure 3:
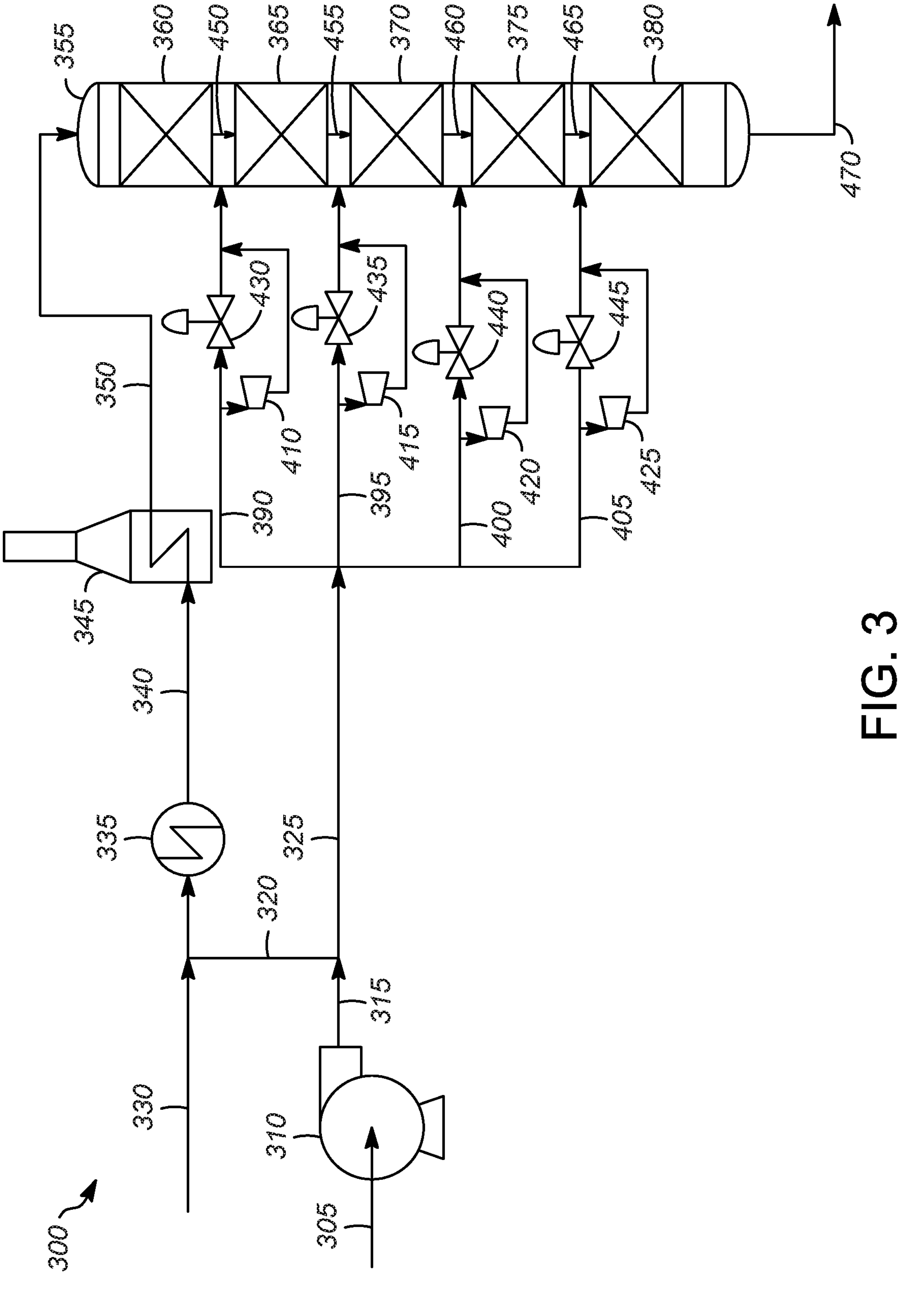
FIG. 3 is an illustration of another embodiment of the revamped process of the present invention.

FIG. 3 illustrates another embodiment of a modified process 300. Hydrogen stream 305 is compressed in compressor 310. The compressed hydrogen stream 315 is split into first and second portions, hydrogen streams 320 and 325. First hydrogen stream 320 is mixed with the hydrocarbon feed stream 330 and sent through heat exchanger 335 to raise the temperature. The partially heated feed stream 340 is sent to fired heater 345 to raise the temperature of the feed stream 350 exiting the fired heater 345 to the desired inlet temperature for the hydroprocessing reaction zone 355.

Second hydrogen stream 325 is divided into four hydrogen quench streams 390, 395, 400, 405. Each of the hydrogen quench streams 390, 395, 400, 405 has a power-recovery turbine 410, 415, 420, 425 to generate power and control the flow of hydrogen entering the hydroprocessing bed as well as a control valve 430, 435, 440, 445 to control the flow of hydrogen entering the hydroprocessing bed.

Hydrogen quench streams 390, 395, 400, 405 can be directed through either the power-recovery turbine 410, 415, 420, 425, the control valve 430, 435, 440, 445, or both. For example, a first fraction of first hydrogen quench stream 390 can be directed to the power-recovery turbine 410, and a second fraction can be directed to the control valve 430. The first fraction can vary from 0% to 100% and the second fraction can vary from 100% to 0%. Thus, the flow of the hydrogen quench streams 390, 395, 400, 405 can be controlled by the power-recovery turbines 410, 415, 420, 425, the control valves 430, 435, 440, 445, or both, allowing excellent process flexibility in systems including both.

Hydroprocessing reaction zone 355 has five hydroprocessing beds 360, 365, 370, 375, and 380. Feed stream 350, which contains hydrogen and hydrocarbon feed to be hydroprocessed, enters the first hydroprocessing bed 360 where it undergoes hydroprocessing. The effluent from the first hydroprocessing bed 360 is mixed with first hydrogen quench stream 390 to form first quenched hydroprocessed stream 450.

The first quenched hydroprocessed stream 450 is sent to the second hydroprocessing bed 365 where it undergoes further hydroprocessing. The effluent from the second hydroprocessing bed 365 is mixed with second hydrogen quench stream 395 to form second quenched hydroprocessed stream 455.

The second quenched hydroprocessed stream 455 is sent to the third hydroprocessing bed 370 where it undergoes further hydroprocessing. The effluent from the third hydroprocessing bed 370 is mixed with third hydrogen quench stream 400 to form third quenched hydroprocessed stream 460.

The third quenched hydroprocessed stream 460 is sent to the fourth hydroprocessing bed 375 where it undergoes further hydroprocessing. The effluent from the fourth hydroprocessing bed 375 is mixed with fourth hydrogen quench stream 405 to form fourth quenched hydroprocessed stream 465.

The fourth quenched hydroprocessed stream 465 is sent to the fifth hydroprocessing bed 380 where it undergoes further hydroprocessing. The effluent 470 from the fifth hydroprocessing bed 380 can be sent to various processing zones, as described above.

Note that the installation of power recovery turbines typically requires the addition of a control valve as either an emergency control option in case of a turbine malfunction or to assist the turbine with flow control. In the case of the subject invention of modification of an existing unit, the cost of installing all the control valves is already sunk from the original project so adding the turbine in the revamp avoids the capital cost of the require control valve versus including that cost in a new unit construction.

The devices and processes of the present invention are contemplated as being utilized in a petroleum, petrochemical, or chemical process zone. As is known, such petroleum, petrochemical, or chemical process zones utilize a process control system, typically on a computer in a control center.

The process control system described in connection with the embodiments disclosed herein may be implemented or performed on the computer with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or the processor may be any conventional processor, controller, microcontroller, or state machine. A processor may also be a combination of computing devices, e.g., a combination of a DSP and a microprocessor, two or more microprocessors, or any other combination of the foregoing.

The steps of the processes associated with the process control system may be embodied in an algorithm contained directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with the processor such the processor reads information from, and writes information to, the storage medium. This includes the storage medium being integral to or with the processor. The processor and the storage medium may reside in an ASIC. The ASIC may reside in a user terminal. Alternatively, the processor and the storage medium may reside as discrete components in a user terminal. These devices are merely intended to be exemplary, non-limiting examples of a computer readable storage medium. The processor and storage medium or memory are also typically in communication with hardware (e.g., ports, interfaces, antennas, amplifiers, signal processors, etc.) that allow for wired or wireless communication between different components, computers processors, or the like, such as between the input channel, a processor of the control logic, the output channels within the control system and the operator station in the control center.

In communication relative to computers and processors refers to the ability to transmit and receive information or data. The transmission of the data or information can be a wireless transmission (for example by Wi-Fi or Bluetooth) or a wired transmission (for example using an Ethernet RJ45 cable or an USB cable). For a wireless transmission, a wireless transceiver (for example a Wi-Fi transceiver) is in communication with each processor or computer. The transmission can be performed automatically, at the request of the computers, in response to a request from a computer, or in other ways. Data can be pushed, pulled, fetched, etc., in any combination, or transmitted and received in any other manner.

According to the present invention, therefore, it is contemplated that the process control system receives information from the power recovery turbines 410, 415, 420, 425 relative to an amount of electricity generated by the power recovery turbines 410, 415, 420, 425. It is contemplated that the power recovery turbines 410, 415, 420, 425 determine (via the processor) the amount of electricity it has generated. Alternatively, the process control system receiving the information determines the amount of electricity that has been generated by the power recovery turbines 410, 415, 420, 425. In either configuration, the amount of the electricity generated by the power recovery turbines 410, 415, 420, 425 is displayed on at least one display screen associated with the computer in the control center. If the petroleum, petrochemical, or chemical process zone comprises a plurality of power recovery turbines 410, 415, 420, 425, it is further contemplated that the process control system receives information associated with the amount of electricity generated by each of the power recovery turbines 410, 415, 420, 425. The process control system determines a total electrical power generated based upon the information associated with the each of the power recovery turbines 410, 415, 420, 425 and displays the total electrical power generated on the display screen. The total electrical power generated may be displayed instead of, or in conjunction with, the amount of electrical power generated by the individual power recovery turbines 410, 415, 420, 425.

As discussed above, the electrical energy recovered by the power recovery turbines 410, 415, 420, 425 is often a result of removing energy from the streams that was added to the streams in the petroleum, petrochemical, or chemical process zone. Thus, it is contemplated that the processes according to the present invention provide for the various processing conditions associated with the petroleum, petrochemical, or chemical process zone to be adjusted into order to lower the energy added to the stream(s). The parallel control valves installed near each turbine could first be balanced by adjusting each turbine to recover more power while decreasing the flow from the associated control valve to maintain the same flow with higher energy recovery from the turbine.

It is contemplated that the process control system receives information associated with the throughput of the petroleum, petrochemical, or chemical process zone, and determines a target electrical power generated value for the turbine(s) since the electricity represents energy that is typically added to the overall petroleum, petrochemical, or chemical process zone. The determination of the target electrical power generated value may be done when the electricity is at or near a predetermined level. In other words, if the amount of electricity produced meets or exceeds a predetermined level, the process control system can determine one or more processing conditions to adjust and lower the amount of electricity generated until it reaches the target electrical power generated value.

Thus, the process control system will analyze one or more changes to the various processing conditions associated with the petroleum, petrochemical, or chemical process zone to lower the amount of energy recovered by the turbines of the petroleum, petrochemical, or chemical process zone. Preferably, the processing conditions are adjusted without adjusting the throughput of the petroleum, petrochemical, or chemical process zone. This allows for the petroleum, petrochemical, or chemical process zone to have the same throughput, but with a lower operating cost associated with the same throughput. The process control software may calculate and display the difference between the target electrical power generated value and the total electrical power generated on the display screen.

For example, the process control software may recognize that the total electrical power generated exceeds a predetermined level. Accordingly, the process control software may determine the target electrical power generated value. Based upon other data and information received from other sensors and data collection devices typically associated with the petroleum, petrochemical, or chemical process zone, the process control software may determine that the amount of fuel consumed in a piece of equipment can be lowered. While maintaining the throughput of the petroleum, petrochemical, or chemical process zone, the amount of fuel consumed in the piece of equipment is lowered. While this may lower the electricity generated by the turbine, the lower fuel consumption provides a lower operating cost for the same throughput.

Thus, not only does the present invention convert energy that is typically lost into a form that is used elsewhere in the petroleum, petrochemical, or chemical process zone, the petroleum, petrochemical, or chemical process zone is provided with opportunities to lower the energy input associated with the overall petroleum, petrochemical, or chemical process zone and increase profits by utilizing more energy efficient processes.

It should be appreciated and understood by those of ordinary skill in the art that various other components, such as valves, pumps, filters, coolers, etc., are not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

SPECIFIC EMBODIMENTS

While the following is described in conjunction with specific embodiments, it will be understood that this description is intended to illustrate and not limit the scope of the preceding description and the appended claims.

A first embodiment of the invention is a process for recovering energy in a petroleum, petrochemical, or chemical plant comprising identifying a first fluid stream having a first control valve thereon in a process zone; installing a first power-recovery turbine at the location of the first control valve; directing at least a portion of the first fluid stream through the first power-recovery turbine to generate electric power therefrom; and recovering the electric power. An embodiment of the invention is one, any or all of prior embodiments in this paragraph up through the first embodiment in this paragraph wherein the first power-recovery turbine is installed in parallel with the first control valve. An embodiment of the invention is one, any or all of prior embodiments in this paragraph up through the first embodiment in this paragraph wherein the first power-recovery turbine is installed in series with the first control valve. An embodiment of the invention is one, any or all of prior embodiments in this paragraph up through the first embodiment in this paragraph wherein the first power-recovery turbine replaces the first control valve. An embodiment of the invention is one, any or all of prior embodiments in this paragraph up through the first embodiment in this paragraph where the first control valve is isolated from the process in normal operation. An embodiment of the invention is one, any or all of prior embodiments in this paragraph up through the first embodiment in this paragraph wherein the power-recovery turbine is sealed with no active gland prone to leakage and fugitive emission. An embodiment of the invention is one, any or all of prior embodiments in this paragraph up through the first embodiment in this paragraph wherein the power-recovery turbine is sealed with no active gland prone to leakage and fugitive emission. An embodiment of the invention is one, any or all of prior embodiments in this paragraph up through the first embodiment in this paragraph wherein installation of the first power-recovery turbine results in a lower temperature of the first fluid stream compared to the first fluid stream with only the control valve; and wherein the lower temperature debottlenecks the plant throughput by increased cooling of a portion of the plant relative to operation without the power-recovery turbine generator. An embodiment of the invention is one, any or all of prior embodiments in this paragraph up through the first embodiment in this paragraph wherein the portion of the plant is within a reaction zone. An embodiment of the invention is one, any or all of prior embodiments in this paragraph up through the first embodiment in this paragraph further comprising rectifying the recovered electrical power to direct current and inverting the direct current into recovered alternating current; and providing the recovered alternating current to a first substation. An embodiment of the invention is one, any or all of prior embodiments in this paragraph up through the first embodiment in this paragraph further comprising identifying a second fluid stream having a second control valve thereon; installing a second power-recovery turbine at the location of the second control valve; directing at least a portion of the second fluid stream through the second power-recovery turbine to generate electric power as direct current therefrom; combining the direct current from the first power-recovery turbine with the direct current from the second power-recovery turbine generator. An embodiment of the invention is one, any or all of prior embodiments in this paragraph up through the first embodiment in this paragraph further comprising providing the recovered direct current to a piece of equipment in the plant. An embodiment of the invention is one, any or all of prior embodiments in this paragraph up through the first embodiment in this paragraph further comprising receiving information from a plurality of pressure reducing devices, the plurality of pressure reducing devices comprising the first power-recovery turbine the first control valve or both; determining a power loss value or a power generated value for each of the pressure reducing devices; determining a total power loss value or a total power generated value based upon the power loss values or the power generated values from each of the pressure reducing devices; and, displaying the total power loss value or the total power generated value on at least one display screen. An embodiment of the invention is one, any or all of prior embodiments in this paragraph up through the first embodiment in this paragraph further comprising adjusting at least one process parameter in the process zone based upon the total power loss value or the total power generated value. An embodiment of the invention is one, any or all of prior embodiments in this paragraph up through the first embodiment in this paragraph further comprising displaying the power loss value or the power generated value on the at least one display screen. An embodiment of the invention is one, any or all of prior embodiments in this paragraph up through the first embodiment in this paragraph further comprising after the at least one process parameter has been adjusted, determining an updated power loss value or an updated power generated value for each of the pressure reducing devices; determining an updated total power loss value or an updated total power generated value for the process zone based upon the updated power loss values or the updated power generated values from each of the pressure reducing devices; and, displaying the updated total power loss value or the updated total power generated value on the at least one display screen. An embodiment of the invention is one, any or all of prior embodiments in this paragraph up through the first embodiment in this paragraph further comprising receiving information associated with conditions outside of the process zone, wherein the total power loss value or the total power generated value is determined based in part upon the information associated with conditions outside of the process zone. An embodiment of the invention is one, any or all of prior embodiments in this paragraph up through the first embodiment in this paragraph further comprising receiving information associated with a throughput of the process zone, wherein the total power loss value or the total power generated value is determined based in part upon the information associated with the throughput of the process zone. An embodiment of the invention is one, any or all of prior embodiments in this paragraph up through the first embodiment in this paragraph further comprising maintaining the throughput of the process zone while adjusting the at least one process parameter of the portion of a process zone based upon the total power loss value or the total power generated value.

A second embodiment of the invention is a process for recovering energy in a petroleum, petrochemical, or chemical plant comprising identifying a first fluid stream having a first control valve thereon in a process zone; installing a first power-recovery turbine at the location of the first control valve; directing at least a portion of the first fluid stream through the first power-recovery turbine to generate electric power as alternating current therefrom; recovering the electric power; rectifying the recovered electrical power to direct current and inverting the direct current into recovered alternating current; and providing the recovered alternating current to a first substation.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for recovering energy in a petroleum, petrochemical, or chemical plant comprising:

identifying a first fluid stream having a first control valve thereon in a process zone;

installing a first power-recovery turbine at the location of the first control valve;

directing at least a portion of the first fluid stream through the first power-recovery turbine to generate electric power therefrom;

recovering the electric power; and providing the recovered power to a low voltage alternating current bus having a voltage of less than 600 VAC in a first substation, or increasing a voltage of the recovered power and providing the recovered alternating current to a medium voltage alternating current bus having a voltage of greater than 5 kVAC in the first substation.

2. The process of claim 1 wherein the first power-recovery turbine is installed in parallel with the first control valve.

3. The process of claim 1 wherein the first power-recovery turbine is installed in series with the first control valve.

4. The process of claim 1 wherein the power-recovery turbine is sealed with no active gland prone to leakage and fugitive emission.

5. The process of claim 1 wherein installation of the first power-recovery turbine results in a lower temperature of the first fluid stream compared to the first fluid stream with only the control valve; and wherein the lower temperature debottlenecks the plant throughput by increased cooling of a portion of the plant relative to operation without the power-recovery turbine generator.

6. The process of claim 1 further comprising:

rectifying the recovered electrical power to direct current and inverting the direct current into recovered alternating current; and providing the recovered alternating current to a first substation.

7. The process of claim 1 further comprising:

identifying a second fluid stream having a second control valve thereon;

installing a second power-recovery turbine at the location of the second control valve;

directing at least a portion of the second fluid stream through the second power-recovery turbine to generate electric power as direct current therefrom;

combining the direct current from the first power-recovery turbine with the direct current from the second power-recovery turbine generator.

8. The process of claim 1 further comprising:

providing the recovered direct current to a piece of equipment in the plant.

9. The process of claim 1 further comprising:

receiving information from a plurality of pressure reducing devices, the plurality of pressure reducing devices comprising: the first power-recovery turbine the first control valve or both;

determining a power loss value or a power generated value for each of the pressure reducing devices;

determining a total power loss value or a total power generated value based upon the power loss values or the power generated values from each of the pressure reducing devices; and, displaying the total power loss value or the total power generated value on at least one display screen.

10. The process of claim 9 further comprising adjusting at least one process parameter in the process zone based upon the total power loss value or the total power generated value.

11. The process of claim 9 further comprising displaying the power loss value or the power generated value on the at least one display screen.

12. The process of claim 9 further comprising:

after the at least one process parameter has been adjusted, determining an updated power loss value or an updated power generated value for each of the pressure reducing devices;

determining an updated total power loss value or an updated total power generated value for the process zone based upon the updated power loss values or the updated power generated values from each of the pressure reducing devices; and, displaying the updated total power loss value or the updated total power generated value on the at least one display screen.

13. The process of claim 9 further comprising:

receiving information associated with conditions outside of the process zone, wherein the total power loss value or the total power generated value is determined based in part upon the information associated with conditions outside of the process zone.

14. The process of claim 9 further comprising:

receiving information associated with a throughput of the process zone, wherein the total power loss value or the total power generated value is determined based in part upon the information associated with the throughput of the process zone.

15. The process of claim 9 further comprising:

maintaining the throughput of the process zone while adjusting the at least one process parameter of the portion of a process zone based upon the total power loss value or the total power generated value.

16. The process of claim 1 wherein a response time of at least one steady state process condition to a new steady state process condition of at least 10% difference is at least one second to reach 50% of the difference between the at least one steady state process condition and the new steady state process condition after modulating the resistance of the turbine.

17. The process of claim 16, wherein the response time for the steady state process condition to reach 50% of the difference between the at least one steady state process condition and the new steady state process condition after modulating the resistance of the turbine is at least ten seconds.

18. A process for recovering energy in a petroleum, petrochemical, or chemical plant comprising:

identifying a first fluid stream having a first control valve thereon in a process zone;

installing a first power-recovery turbine at the location of the first control valve;

directing at least a portion of the first fluid stream through the first power-recovery turbine to generate electric power as alternating current therefrom;

recovering the electric power;

rectifying the recovered electrical power to direct current and inverting the direct current into recovered alternating current;

providing the recovered alternating current to a first substation; and providing a portion of the recovered alternating current to a second substation.

19. The process of claim 18 further comprising:

increasing a voltage of the recovered alternating current before providing the portion of the recovered alternating current having the increased voltage to the second substation.

20. A process for recovering energy in a petroleum, petrochemical, or chemical plant comprising:

identifying a first fluid stream having a first control valve thereon in a process zone:

installing a first power-recovery turbine at the location of the first control valve wherein the first power-recovery turbine has a variable resistance to flow based on a variable load on an electrical power generation circuit;

directing at least a portion of the first fluid stream through the first power-recovery turbine to generate electric power as alternating current therefrom·, recovering the electric power;

rectifying the recovered electrical power to direct current and inverting the direct current into recovered alternating current;

providing the recovered alternating current to a first substation; and providing a portion of the recovered alternating current to a second substation.

* * * * *